March 4, 1952     H. WIRTH     2,587,945
FRICTION DISK AND METHOD OF MAKING SAME
Filed July 1, 1947     2 SHEETS—SHEET 1
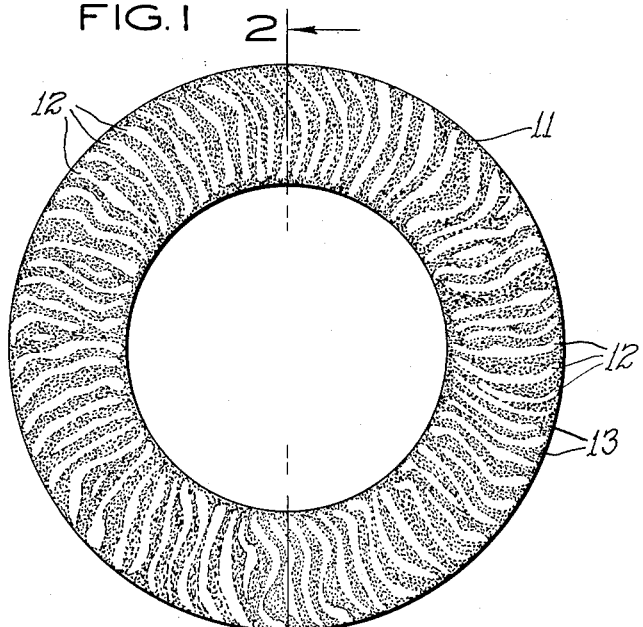
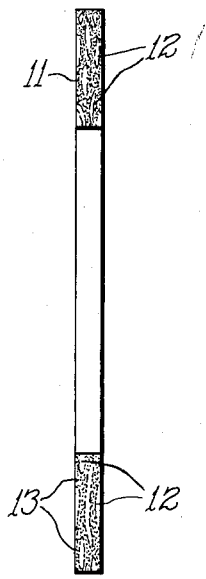
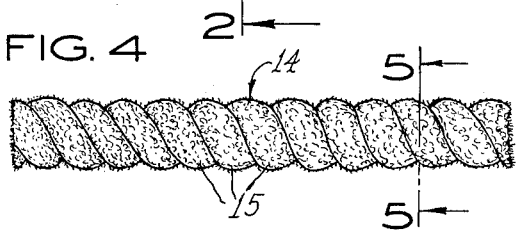
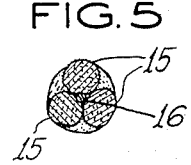
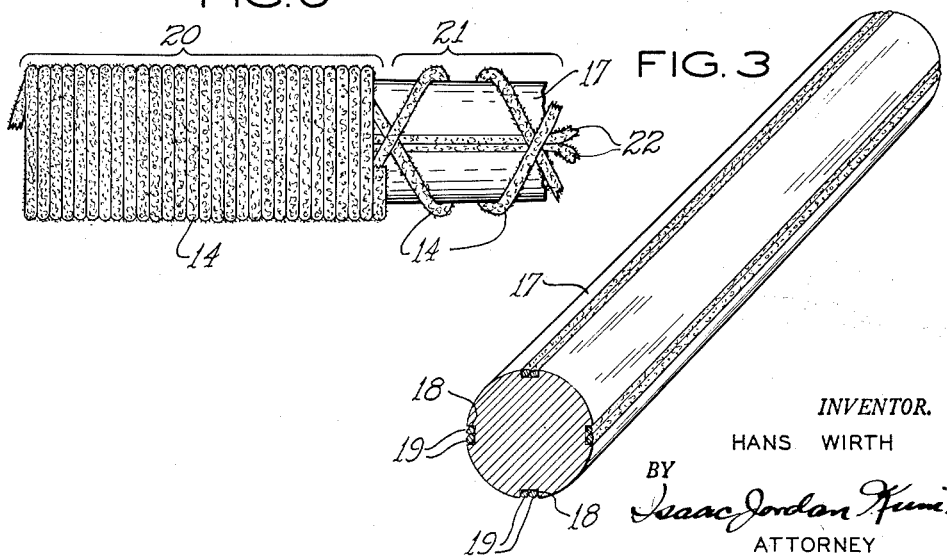
INVENTOR.
HANS WIRTH
BY Isaac Jordan Kunik
ATTORNEY March 4, 1952  H. WIRTH  2,587,945
FRICTION DISK AND METHOD OF MAKING SAME
Filed July 1, 1947  2 SHEETS—SHEET 2
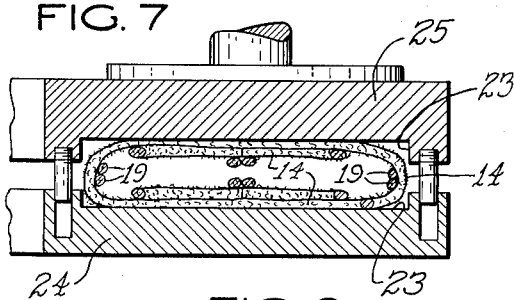
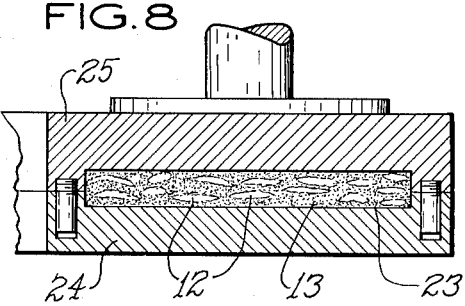
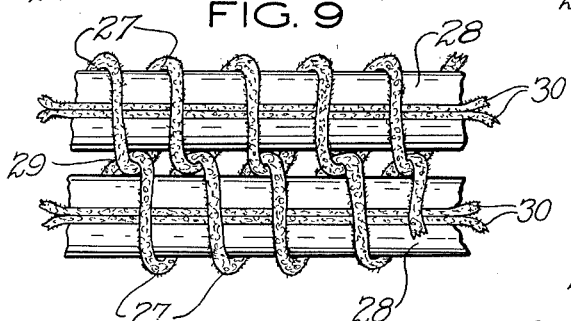
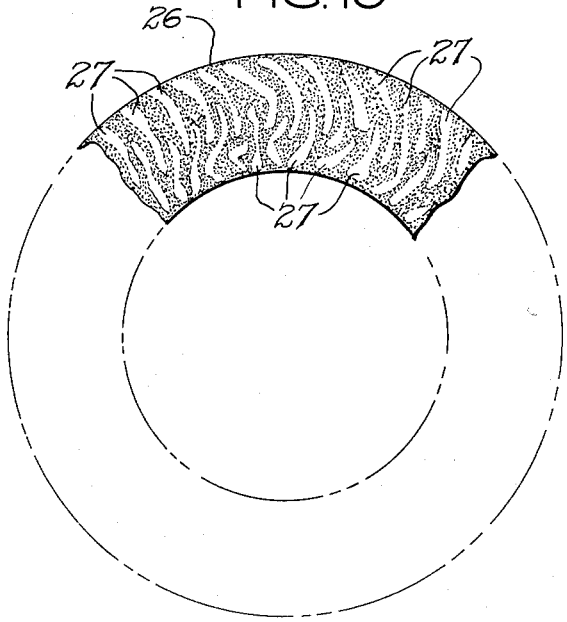
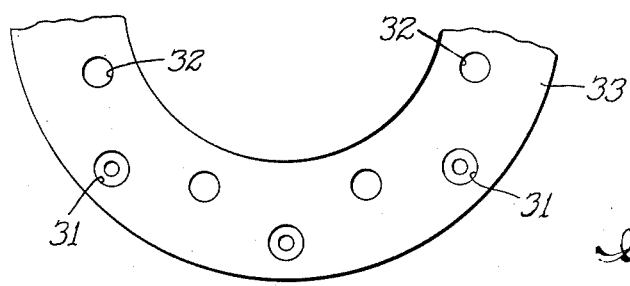
INVENTOR.
HANS WIRTH
BY
Isaac Jordan Kunik
ATTORNEY Patented Mar. 4, 1952

2,587,945

UNITED STATES PATENT OFFICE 2,587,945

FRICTION DISK AND METHOD OF MAKING SAME

Hans Wirth, Middletown, Conn., assignor to Connecticut Asbestos Products, Inc., New York, N. Y., a corporation of Connecticut Application July 1, 1947, Serial No. 758,402

9 Claims. (Cl. 154—81)

This invention relates to friction disks.

An object of this invention is to provide a clutch friction disk having an improved structure.

Another object of this invention is to provide an improved clutch friction disk having maximum resistance to bursting by centrifugal force.

Another object of this invention is to provide an improved method of making clutch friction disks.

A further object of this invention is to provide an improved method of making clutch friction disks whereby danger of bursting by centrifugal force is substantially reduced or eliminated.

Other objects and advantages of the invention will appear as the description of the accompanying drawing proceeds. However, I desire to have it distinctly understood that I do not intend to limit myself to the exact details shown or described, but that I intend to include as part of my invention all such obvious changes and modifications of parts as would occur to a person skilled in this art, and as would fall within the scope of the claims.

For a fuller understanding of the nature and objects of the invention as well as for specific fulfillment thereof, reference should be had to the following detailed description taken in connection with the accompanying drawings, in which:

Figure 1 is a face view of a clutch friction disk made in accordance with the present invention:

Figure 2 is a sectional view of the clutch friction disk taken on line 2—2 of Figure 1;

Figure 3 is a perspective view, with one end in cross-section, of a mandrel used in making a clutch friction disk in accordance with the present invention;

Figure 4 is a surface view of a twisted fiber strand used in making a clutch friction disk according to the present invention;

Figure 5 is a cross-section of the strand taken on line 5—5 of Figure 4;

Figure 6 is a schematic view partly cut away, of the helical winding of the strands on the mandrel;

Figure 7 is a schematic cross-section view of a mold in which the wound strands are placed before pressure is applied to form the clutch friction disks;

Figure 8 is a view similar to Figure 7 after pressure has been applied;

Figure 9 is a schematic illustration of the manner in which a plurality of helical windings may be formed;

Figure 10 is a face view of a clutch friction disk made with two helical windings; and Figure 11 is a diagrammatic view of a portion of a clutch friction disk showing the holes formed therein for mounting the disk on the clutch plate.

In the past, clutch friction disks or clutch facings have been made of a spiral coil of impregnated fiber web or tape, pressed and hardened with various binders and fillers. In operation under high friction-generated heat and high speed rotation it has been found that centrifugal force causes the friction disk to crack, particularly between the spiral windings. The thermosetting binder was incapable of holding together the spiral windings under conditions of great friction, high heat and centrifugal force.

The tendency of spirally wound friction disks to crack and unravel under severe operating conditions is overcome by the present invention which provides for a novel and superior structure to be incorporated into such disks. According to the present invention, friction disks are made in a manner such that their structure offers maximum resistance to bursting by centrifugal force. This is accomplished by arranging the strands of fiber material in a predominantly radial pattern rather than in a spiral or circular pattern. The arrangement of stands in a substantially radial pattern permits the utilization of the full strength of the strands to withstand the effects of centrifugal force.

Referring now to the drawing, Figure 1 shows a face view of clutch friction disk 11 made according to the present invention, wherein the white areas 12 represent strands of twisted fiber, and the stippled dark areas 13 represent the binder and filler material. Figure 2 is a cross-section taken on line 2—2 of Figure 1 showing the relationship between the strands 12 and the filler 13.

Figure 4 shows a twisted strand 14 of fiber material which may preferably consist of three strings 15 of fiber material twisted around a wire core 16 as shown in cross-section in Figure 5. The fiber material may preferably consist of about eighty-five per cent asbestos fiber together with about fifteen per cent of cotton fiber. These proportions may vary or other types of fibers may be used. More than one wire may be used as the core for the twisted strands. The wire cores may consist of copper, aluminum, brass, zinc or other metal.

The strand 14 is thereafter treated with a preparation which serves both as a filler and a thermosetting binder for the friction disk. The following alternative formulae may be used in batch compositions:

Formula #1

30 lbs. oil (linseed, tung, oiticicia, soybean)
70 lbs. cresylic acid-formaldehyde resin, or phenol formaldehyde resin
30 lbs. carbon black
30 lbs. powdered brass (40 mesh)
10 lbs. powdered aluminum (40 mesh)
70 lbs. alcohol
30 lbs. toluol

Formula #2

15 lbs. rubber (natural or synthetic, in solution or as latex)
10 lbs. sulphur
3 oz. accelerators
4 oz. antioxidants
45 lbs. phenol formaldehyde resin, or cresylic acid-formaldehyde resin
15 lbs. carbon black
15 lbs. powdered brass (40 mesh)
5 lbs. powdered aluminum (40 mesh)
50 lbs. alcohol
30 lbs. solvent naphtha
15 lbs. toluol

Formula #3

10 lbs. oil (linseed, tung, oiticicia, soybean)
10 lbs. rubber (natural or synthetic, in solution or as latex)
6 lbs. sulphur
2 oz. accelerators
3 oz. antioxidants
40 lbs. cresylic acid-formaldehyde resin, or phenol formaldehyde resin
15 lbs. carbon black
15 lbs. powdered brass (40 mesh)
5 lbs. powdered aluminum (40 mesh)
50 lbs. alcohol
40 lbs. solvent naphtha
10 lbs. toluol These formulae may be varied as to their proportions and content, depending upon the type of friction disk to be made and the use to which it is to be put.

After being thoroughly impregnated with the bonding and friction material, the strands are dried by the application of heat or blast of air or both, in order to drive off the various solvents used in the above outlined formulae.

The impregnated strands are then wound upon mandrel 17 illustrated in Figure 3. Mandrel 17 has several longitudinal grooves 18 into which one or more lengths of strands 19 may be inserted. The mandrel also has a slight taper to facilitate the removal of the strands after winding. The impregnated strands are then helically wound in the manner shown in Figure 6. The winding may take the form as shown in the helical section 20. Alternatively the winding may take the form of a loose helical winding section 21 over which there is superimposed a close helical winding similar to the winding in section 20. Longitudinal strands 22 are those that were placed in grooves 18 of mandrel 17. The longitudinal strands may be omitted when not required in some applications. I prefer, however, to provide for a plurality of longitudinal strands or an aggregate of at least eight longitudinal strands to impart strength to the finished disk. The mandrel 17 may be made of wood, steel or other material.

After the strands are wound on the mandrel in the manner described, the windings are slipped off the mandrel which is slightly tapered to facilitate this operation. The helical winding is then placed in the annular channel 23 of a ring shaped mold 24 (Figure 7) with the two ends of the helical winding superimposed or overlapping in order to form a continuous integral ring in the mold. Figure 7 schematically shows a section view of the mold 24 with the helical strand windings 14 and the longitudinal strands all placed loosely in the channel 23 of the mold 24, and then covered with the press plate 25. Thereafter pressure is applied which flattens the strands as illustrated in Figure 8. At the same time that pressure is applied, the mold and its contents are subjected to a heat treatment at between 200° F. to 400° F. and preferably at 300° F. for about five to fifteen minutes and preferably ten minutes. The temperature and time may vary depending upon the thermosetting properties of the bonding material used and the purposes to which the friction disks are to be put. The pressure and heat causes the filler and binding material 13 to flow and harden in the interstices between the strands 12 (Figure 8). After compression and heating, the ring disk may be removed from the mold and given successive heat and pressure treatments.

After the final heating and pressing treatments, the friction disk may have its surfaces ground to the desired size to produce a clutch facing as shown in Figure 1.

It may also be desired to produce a friction disk 26 as shown in Figure 10. Two concentric rows of strands 27 which are arranged in a radial pattern may provide a friction disk which may be more advantageous for certain purposes. The method of winding interlocking helical strands is illustrated in Figure 9 where strands 27 are wound on two adjacent mandrels 28 with each turn of the strands interlocking where they meet at 29. Longitudinal strands 30 may be provided if desired. Figure 9 shows the helices opened up to clearly illustrate the manner in which the strands are wound. The procedure in producing the finished disk is substantially the same as that in producing the single helically wound friction disks. The number of concentric rows of helically wound strands may be more than two, depending upon the purposes to which the friction disks are to be put.

After the disk has been ground to size, holes 31 and 32 are cut in the disk 33, a broken section of which is shown in Figure 11. These holes 31 and 32 are formed for mounting the disk on a clutch plate.

The strands shown in Figure 1 form a substantially radial pattern. It is also with the purview of the present invention to wind the strands upon a flat ruler shaped stick, a length of angle iron, or on mandrels of elliptical or other diverse shapes. If a ruler shaped stick is used as a winding mandrel the configuration of the strands may be more exactly radial than that shown in Figure 1. I prefer, however, to wind the strands on a circular mandrel because when the helices are flattened in the mold, the strands assume a slightly curved form crossing similarly curved strands on the under side of the helices so that they interlock under pressure and impart great strength to the finished disk.

I have found that any means of placing the fiber strands in a predominantly substantially radial pattern provides clutch friction disks that are superior to those made heretofore in respect of strength, long life and resistance to cracking and splitting by centrifugal force. The method of the present invention provides a friction disk whose burst strength is substantially increased and thus the danger of bursting and unraveling because of centrifugal force and high friction-generated heat is greatly reduced, or substantially eliminated.

It is also possible to make friction disks in accordance with the present invention by cutting impregnated strands into short lengths and placing them individually in a predominantly radial pattern in the mold. The resultant friction disk would have an appearance similar to that shown in Figure 1.

The present invention also contemplates that the longitudinal and helical strands as a unit may be pressed and heated in the form of a flat strip which may be cut and shaped into brake linings and other types of friction facings as desired.

While the present invention, as to its objects and advantages, has been described herein as carried out in specific embodiments thereof, it is not desired to be limited thereby but it is intended to cover the invention broadly within the spirit and scope of the appended claims.

I claim:

1. The method of making a clutch friction disk which comprises placing a plurality of impregnated fabric strands longitudinally upon a mandrel, helically winding impregnated fabric strands around said longitudinal strands on said mandrel, removing said longitudinal and helically wound strands from said mandrel, and pressing said strands in the form of a ring disk.

2. A friction disk comprising a set of longitudinal strands and another set of strands helically wound around said longitudinal strands, said longitudinal set of strands being completely surrounded by and included within the helically wound set of strands, the combination of said longitudinal and helical strands having been subjected to heat and pressure to form a flat disk with said helical windings being positioned in a substantially radial pattern.

3. A friction material comprising a set of longitudinal strands and a second set of strands helically wound around said longitudinal strands, said strands having been treated with thermosetting binder prior to the arrangement of said strands being placed in their respective longitudinal and helical positions, said set of longitudinal strands being completely surrounded by and contained within said set of helical strands, the combination of said longitudinal and helical strands having been subjected to pressure to form a flat unit.

4. The method of making a friction material which comprises placing a plurality of impregnated fabric strands longitudinally on a mandrel, helically winding impregnated fabric strands around said mandrel, said helical windings completely surrounding said longitudinal windings, removing said longitudinal and helically wound strands as a unit from said mandrel, and subjecting said combination of strands to pressure and heat to form a flat hard unit.

5. The method of making a friction material which comprises placing a plurality of impregnated fabric strands longitudinally upon a mandrel, helically winding impregnated fabric strands around said mandrel, removing said longitudinal and helically wound strands as a unit from said mandrel, and pressing said strands in the form of a flat hard unit.

6. A clutch facing in the form of a compressed disk comprising a plurality of longitudinal impregnated strands and impregnated strands helically wound around and completely surrounding said longitudinal strands.

7. The method of making friction material which comprises placing a plurality of impregnated fabric strands longitudinally upon a mandrel, helically winding impregnated fabric strands around said longitudinal strands on said mandrel, removing said longitudinal and helically wound strands from said mandrel, and pressing and heating said strands in the form of a flat hard unit with said windings being positioned in a substantially radial pattern.

8. A friction facing comprising a base of a plurality of longitudinal impregnated strands, at least one layer of open helical windings of impregnated strands, and a cover layer of close helical windings of impregnated strands, the combination of said layers being pressed into a flat strip.

9. The method of making friction material which comprises placing a plurality of impregnated fabric strands longitudinally upon a mandrel, placing at least one layer of loose helically wound impregnated strands around said longitudinal strands on said mandrel, placing at least one layer of close helically wound impregnated strands around said loosely wound strands, removing said longitudinal and helically wound strands as a unit from said mandrel, and pressing and heating said combination of strands in the form of a flat hard unit.

HANS WIRTH.

REFERENCES CITED

The following references are of record in the file of this patent:

UNITED STATES PATENTS

| Number | Name | Date |
|---|---|---|
| 1,620,043 | Stanley | Mar. 8, 1927 |
| 1,638,012 | Hoof | Aug. 9, 1927 |
| 2,240,358 | Walters | Apr. 29, 1941 |
| 2,258,237 | Bockius et al. | Oct. 7, 1941 |
| 2,264,901 | Gosling | Dec. 2, 1941 |
| 2,277,602 | Novak | Mar. 24, 1942 |
| 2,431,883 | Morton | Dec. 2, 1947 |
| 2,448,114 | Olson et al. | Aug. 31, 1948 |